Figure 1:
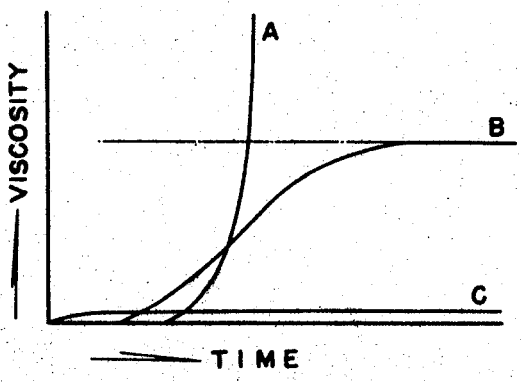

3,183,201
METHOD OF PRODUCING POLYVINYL CHLORIDE FIBERS HAVING IMPROVED THERMAL PROPERTIES
Jiro Shimeha, Shuji Ozawa, Ikuzo Tanaka, Shunichi Matsumura and Hiroaki Kubota, all of Iwakuni-shi, Yamaguchi-ken, Japan, assignors to Teikoku Jinzo Kenshi Kabushiki Kaisha, Nishi-ku, Osaka, Japan, a corporation of Japan
Filed Mar. 29, 1960, Ser. No. 18,280
Claims priority, application Japan, Mar. 31, 1959, 34/9,895; Apr. 22, 1959, 34/12,941; Sept. 3, 1959, 34/27,976, 34/27,977; Sept. 25, 1959, 34/30,678; Oct. 29, 1959, 34/34,154
9 Claims. (Cl. 260—31.2)

This invention relates to a method of producing polyvinyl chloride fibers having improved thermal properties. More particularly the invention relates to a method of producing on an industrial scale synthetic fibers having high dimensional stability from either highly crystalline polyvinyl chlorides or copolymers containing more than 90 mol percent of vinyl chloride units.

Hereinafter, the polyvinyl chloride and the copolymers containing more than 90 mol percent of vinyl chloride units and vinyl or other unsaturated compounds will be referred to as vinyl chloride polymers.

An object of this invention is to provide a method of producing on an industiral scale fibers having high dimensional stability from vinyl chloride polymers.

Another object of the invention is to provide criteria of selecting vinyl chloride polymers suitable for spinning and manufacturing on an industrial scale into fibers possessed of high dimensional stability.

A still further object of the invention is to provide an industrial method of preparing a spinning solution by dissolving vinyl chloride polymers having comparatively high crystallinity.

A further object of the invention is to provide a method of preparing first a stable slurry of swollen vinyl chloride polymers in order to render easy the handling of said vinyl chloride polymers in preparing the solution thereof from those vinyl chloride polymers possessing comparatively high crystallinity.

A still further object of the invention is to provide criteria of selecting solvents suitable for preparing the aforesaid stable slurry.

A yet another object of the invention is to provide a method of dissolving the aforesaid slurry and methods of drawing and heat setting the fibers obtained from the vinyl chloride polymers possessing comparatively high crystallinity.

Other objects of the invention will become apparent from the description given hereinafter.

Lately, there have been proposals of methods of polymerizing vinyl chloride at, for example, such a low temperature as below 20° C. to —50° C., and the density of the formed articles of vinyl chloride polymers polymerized at such a low temperature as these is about 1.405—1.440 g./cm.$^3$. It is generally recognized that the crystallinity of such polymers is higher than that of the conventional polymers which have been polymerized at higher temperatures. [Refer to the Journal of the Chemical Society of Japan, Industrial Chemistry Section, vol. 61, page 1322 (1958) and Belgium Patent No. 569,632]. It is also known that the articles formed of these highly crystalline polymers of vinyl chloride, when compared with those of polymers of vinyl chloride polymerized at a higher temperature, manifest a conspicuous enhancement in their dimensional stability as well as mechanical properties especially at a higher temperature, for example, such as tenacity, elasticity, modulus and hardness.

On the other hand, despite the fact that excellent properties as hereinabove described are possessed by these articles formed of polymers of vinyl chloride polymerized at a lower temperature, on account of the lowering in their solubility and formability, it is very difficult in the first place to prepare the spinning solution on an industrial scale by dissolving these vinyl chloride polymers as in the conventional dry spinning and wet spinning processes. In fact, the existing state of affairs is such that there has been practically no literature to date reporting in detail any way of producing fibers from polymers of vinyl chloride polymerized at low temperatures.

In order to produce on an industrial scale fibers of vinyl chloride polymers improved in their thermal properties we found that by carrying out the following steps it was very effective. In the first place, vinyl chloride polymers having an average degree of polymerization and falling within a specified range as to their degree of crystallinity were used. Then, instead of instantly dissolving these polymers in the solvent used, a stable slurry of said polymers and the solvent was prepared. Operations such as transporting this slurry, etc. were performed while in this slurry state, and then the slurry was dissolved in as short a time as possible, followed immediately by performing the spinning so that the time in which the polymer remains in the dissolved state was reduced to as short a time as possible. Thus, we found that it was possible to produce on an industrial scale fibers from the hereinabove described vinyl chloride polymers obtained by polymerization at a low temperature.

For sake of simplicity, the invention will be described with respect to pure polyvinyl chloride. First, an explanation will be made of the characteristics required of the vinyl chloride polymers to be in this invention.

As already described hereinabove, it is necessary that the starting material for obtaining the fibers from vinyl chloride polymer improved in their thermal properties be highly crystalline polymers. While heretofore many attempts have been made for determining the degree of crystallinity of polyvinyl chloride, none have been standardized.

Lately, according to Mizushima et al. (Lecture at the Conference on High Polymers at Osaka, Japan, September 1958), it has been discovered that with respect to the infrared absorption spectra of vinyl chloride polymers, the absorption at 1426 cm.$^{-1}$ is caused by the bending motion of —CH$_2$-group in the crystalline part and the absorption at 1434 cm.$^{-1}$ is caused by the bending of —CH$_2$-group in the amorphous part of the polymer.

Following the reports of the aforesaid Mizushima et al., we made comparisons of the ratio, D1426/D1434, of the optical densities at 1426 cm.$^{-1}$ to 1434 cm.$^{-1}$ of the infrared absorption of the several kinds of vinyl chloride polymers with the properties of the respective fibers obtained from these polymers. The data are shown in Table I.

TABLE I

| Sample No. | Polymerization | | | Properties of polymers | | | Properties of fibers | | | |
|---|---|---|---|---|---|---|---|---|---|---|
| | Temp. (° C.) | Catalyst a | Medium | P̄ b | D/D c | SP. G. d (cm.³/gr.) | Density (cm.³/gr.) | S e (percent) | Tenacity (gr./den.) | Extensibility (percent) |
| 1 | 55 | B.P.O. | Water | 1,430 | 1.015 | 0.47 | 1.398 | 32.8 | 3.2 | 21.3 |
| 2 | −20 | B(Bu)₃ | Monomer | 1,180 | 1.192 | 0.16 | 1.410 | 11.8 | 1.4 | 14.1 |
| 3 | −20 | B(Et)₃ | do | 2,500 | 1.177 | 0.11 | 1.409 | 8.3 | 3.1 | 14.6 |
| 4 | −30 | B(Et)₃ | do | 1,200 | 1.321 | 0.13 | 1.413 | 9.7 | 3.5 | 14.1 |
| 5 | −40 | B(Et)₃ | do | 1,260 | 1.260 | 0.13 | 1.414 | 6.6 | 1.8 | 12.6 |
| 6 | −78 | B(Bu)₃ | do | 4,000 | 1.293 | 0.14 | 1.42 | | | |
| 7 | 0 | R₁ | Methanol water | 980 | 1.080 | 0.19 | 1.404 | 30.2 | 2.1 | 18.6 |
| 8 | −20 | R₁ | do | 1,210 | 1.188 | 0.17 | 1.413 | 17.0 | 2.7 | 19.9 |
| 9 | −20 | R₁ | do | 980 | 1.193 | 0.24 | 1.412 | 14.4 | 2.8 | 22.3 |
| 10 | −30 | R₁ | do | 1,510 | 1.226 | 0.18 | 1.417 | 11.0 | 2.3 | 17.6 |
| 11 | −30 | R₁ | do | 1,040 | 1.231 | 0.20 | 1.416 | 7.1 | 2.3 | 16.4 |
| 12 | −25 | R₂ | do | 1,190 | 1.105 | 0.13 | 1.416 | 18.5 | 4.1 | 15.1 |
| 13 | +14 | R₂ | do | 1,370 | 1.106 | 0.10 | 1.402 | 27.9 | 3.8 | 19.6 |
| 14 | −4 | R₂ | do | 1,720 | 1.114 | 0.16 | 1.401 | 26.1 | 3.0 | 18.4 |
| 15 | −20 | R₂ | do | 1,190 | 1.118 | 0.15 | 1.410 | 18.7 | 2.8 | 24.6 | a B.P.O.—Benzoyl peroxide. B(Bu)₃—Boron tributyl. B(Et)₃—Boron triethyl. R₁—Fenton reagent—mild reductant. R₂—(Co-napthenate-H₂O₂)—reductant.
b P̄—Average degree of polymerization (viscometric).
c D/D—D1426/D1434. The D/D-value is determined as the optical density ratio of infrared absorption by sample polymers at 1426 cm.⁻¹ to 1434 cm.⁻¹, where the percentage transmittance at 1530 cm.⁻¹ is above 80 and the percentage transmittances at both 1426 cm.⁻¹ and 1434 cm.⁻¹ are between 15–50. The test pieces of sample polymers are shaped by compressing the powdery mixture of polymer and KBr. Although when the solvent extraction, reprecipitation, and heating are performed with respect to identical materials, these values change somewhat, since in case of sufficiently refined samples a precision of =0.01 can be attained, it was found that these values could reasonably be considered as being indications of the inherent characteristics of the material.

d Sp. G.—Apparent specific gravity measured by means of JIS—K6721 ('55), so-called bulk density in gr./cm.³
e S—Percentage shrinkage of the fibrous samples when immersed in boiling water for 5 minutes—Conditions for preparation of fibrous samples:
10 parts of the polymer were dissolved into 90 parts of cyclohexanone while heating, and then spun into methanol by wet spinning at ordinary temperatures. Drafting ratio on spinning: 1.0–1.5. Windup speed 1–5 m./min. After rinsing the fiber obtained in methanol for 3–7 days, it was drawn in a glycerine bath at a temperature of 100–115° C. with a drawing ratio of 4–10 times, and thereafter while using the same temperature, it was heat set at constant length (so called "set at stretch") for 10 minutes.

In this invention, the ratio D1426/D1434, of the optical density at 1426 cm.⁻¹, D1426, to the optical density at 1434 cm.⁻¹, D1434, of the infrared absorption of the vinyl chloride polymers will be abbreviated as "D/D" for sake of simplicity.

Table I shows that, the larger the D/D values possessed by the material polymers, the greater was the improvement attained in the thermal property of the fibers obtained from them, independently of the type of polymerization, with the exception of the temperature at which the polymerization was carried out. In other words, it reveals that the lower the temperature at which the polymers were polymerized, the larger the D/D values the polymers would have. When the D/D value of the commercially available polyvinyl chloride obtained by the conventional high temperature polymerization method was sought after having purified them by rinsing in methanol for 2 hours at 60° C. and dried, results as shown in Table II were obtained, in which it was shown that the D/D values of the commercially available polyvinyl chloride obtained by the high temperature polymerization method were in all cases below 1.08. Thus it was confirmed that their D/D values were without exception smaller than that of the polyvinyl chloride obtained by the low temperature polymerization method.

TABLE II

| Trademark | Manufacturer | P̄ | D/D | Apparent Sp. G. |
|---|---|---|---|---|
| Aron-F | Toa Gosei Co., Ltd. | 1,350 | 1.027 | 0.33 |
| Nikavinyl-A | Nihon Carbide Co., Ltd. | 1,400 | 1.009 | 0.42 |
| Nikavinyl-S | do | 1,000 | 1.012 | 0.35 |
| Nipolit-S | Shin-Nihon Chisso Co., Ltd. | 1,300 | 1.012 | 0.31 |
| Oparon-300J | Monsanto Kasei Co., Ltd. | | 1.008 | 0.38 |
| Vinoflex-385 | Badische Anilin & Soda F | 1,950 | 1.060 | 0.29 |

P̄: See footnote (b) of Table I; D/D: See footnote (c) of Table I; Sp.G.: See footnote (d) of Table I.

From the aforesaid reasons, although it has become apparent that it was possible to obtain fibers having substantially high dimensional stability if polymers having comparatively high D/D values are used, for example, in case of Sample No. 6 of Table I, when the dissolving of 10 parts of polyvinyl chloride whose D/D=1.293 (degree of polymerization:4,000) in 90 parts of cyclohexanone was attempted at about 90° C., the dissolving was not possible. On the other hand, in case of the polyvinyl chloride of Sample No. 1 whose D/D=1.015 (degree of polymerization 1430), the percent-shrinkage in boiling water of its fiber was 32.8 and it can be seen that its dimensional stability was very poor.

In the above manner, we investigated the thermal properties of the fibers from vinyl chloride polymers of various D/D-values. As a result, we found that fibers from the vinyl chloride polymers specified by D/D-values of more than 1.08 were superior in their thermal properties to those obtained by the conventional high temperature polymerization method. However, in the case of those vinyl chloride polymers specified by D/D>1.27, on account of their being less soluble in the solvents, many troubles have occurred in processing them. Consequently, in this invention we arrived at the conclusion that it was necessary to use in the first place the vinyl chloride polymers specified by the D/D-values ranging between 1.08 and 1.27.

While we have found that the use of vinyl chloride polymers specified by the D/D-values ranging between 1.08 and 1.27 was one of the necessary conditions to make the processes of both dissolving and spinning easy, as well as to form fibers having high dimensional stability, it was also found that a very close inter-relationship existed between the degree of polymerization of the vinyl chloride polymers and the solubility of the polymers as well as their ability of fiber formation. As a result of having made various investigations into the relationship between the degree of polymerization of the vinyl chloride polymers on one hand and their solubility and ability of fiber formation on the other, we found that, besides the condition requiring the D/D-value of the polymer be from 1.08 to 1.27, it was an important requisite that the vinyl chloride polymer whose degree of polymerization is from 500–2500 be selected in order to render into fibers on an industrial scale polyvinyl chlorides having high dimensional stability.

TABLE III

| Sample No. | Temp. sample polymerized at (° C.) | $\bar{P}$ | D/D | Solubility |
|---|---|---|---|---|
| 1 | −50 | ca. 3,000 | 1.286 | Soluble only up to 4.3 weight percent in hot T.H.F. |
| 2 | −30 | ca. 4,000 | 1.241 | Insoluble at the conc. of 10 weight percent in hot T.H.F. |
| 3 | −40 | ca. 2,500 | 1.264 | Soluble at the conc. of 10 weight percent in hot T.H.F. |
| 4 | −15 | 4,810 | 1.147 | Insoluble at the conc. of 10 weight percent in hot T.H.F. |
| 5 | −18 | 3,760 | 1.198 | Soluble, but gelation occurred on cooling. |
| 6 | −28 | 2,890 | 1.223 | Do. |
| 7 | −5 | 620 | 1.102 | Can be spun from Anon solution containing 12 weight percent of polymer. |
| 8 | −30 | 450 | 1.233 | Can be spun from Anon solution containing 12 weight percent of polymer, but the fiber obtained is brittle. |
| 9 | 0 | 420 | 1.095 | Cannot be spun because of occasional break in continuity of fiber. |

T.H.F.—Tetrahydrofuran. Anon—Cyclohexanone.

In Table III, the interrelation between the degree of polymerization of vinyl chloride polymers, and their solubility to the solvent and the ability of fiber formation is shown.

It can be understood from the foregoing Table III that in the case of a vinyl chloride polymer whose degree of polymerization is more than 2500, a solution of high concentration cannot be obtained even if a good solvent is used, while in case of that with a degree of polymerization less than 500, its ability of fiber formation becomes very poor.

Thus, we found the necessity of selecting and using vinyl chloride polymers whose D/D-value is between 1.08–1.27 and the degree of polymerization is between 500–2500 in order to obtain on an industrial scale fibers having high dimensional stability.

The aforesaid vinyl chloride polymers having a D/D value of 1.08–1.27 and degree of polymerization between 500–2500 will be hereinafter referred to, for sake of convenience, as PVC-L, and the method of dissolving the same in this invention will be described below. While we have described hereinabove that these PVC-L are those that fall within the range as to make possible the operations of such as dissolving, spinning, etc. as well as the obtaining of fibers having high dimensional stability, we found however that their behavior with respect to the solvents manifested great differences from that of the conventional vinyl chloride polymers. Those points of differences that became the greatest obstacles during the process of fiber production were two in number. First, when PVC-L is used, and in order to obtain a concentration of the spinning solution most suitable for the production of fibers it is combined with a solvent in an amount 1.0–4 times by weight thereof, the difficulty lies in the fact that a solvent which can completely dissolve the polymer is not readily available. Even if it were possible to accomplish the complete solution under unpractical laboratory conditions, an account of the occurrence of gelation when it is kept standing, it is after all impossible to obtain directly a stable solution. Secondly, in practically every instance when PVC-L is mixed with a solvent, the solvent immediately becomes absorbed by the polymer and does not become a stable slurry-like mixture whose viscosity change is small but becomes such that the whole mixture exhibits a wet sand-like appearance. Thus, manifesting no fluidity at all, its handling on an industrial scale becomes very difficult. Of course, it is possible to dissolve this mixture by heating but with gelation easily occuring, it cannot be said to be a stable solution.

While in handling the conventional vinyl chloride polymers both of the aforementioned points need to be considered also, in case of PVC-L, this is particularly true. In view of these characteristics, we found that in order to make possible the production of fibers on an industrial scale from PVC-L, it was necessary to first prepare a stable slurry of restrictedly swollen polymer particles with small change in its viscosity by mixing the polymer with the solvent until the viscosity of the mixture tends to an equilibrium value and then while maintaining it in this slurry-like state with small change in its viscosity to carry out the various operations necessary until dissolving, followed by spinning within a short time while heating and dissolving the mixture. And as a result of our detailed study of these two aforesaid abnormal characters which become obstacles in practicing the method of this invention while using PVC-L, we found the three requisites for solving these obstacles and thus were able to arrive at a method for producing on an industrial scale vinyl chloride fibers having superior dimensional stability.

(1) By increasing the apparent specific gravity of the PVC-L polymers.
(2) By preparing a stable swollen slurry by the combination of the PVC-L obtained in (1) with the solvent.
(3) By spinning immediately the slurry obtained in (2) after heating and dissolving the same in a short time.

These three methods will be described hereinafter in detail in the order given.

(1) Method of increasing the apparent specific gravity of the polymer

When we made a further study into the differences in the characteristics of PVC-L and the conventional vinyl chloride polymers in their behaviors with respect to solvents, we found surprisingly that there was a great difference between the apparent specific gravities of the two, and also that the apparent specific gravity was an important factor in the preparation of a stable swollen slurry. While it is conceivable that the apparent specific gravity of the polymer particles is subject to change depending upon its formation condition, the bulkiness of the polymers prepared by precipitation polymerization, which is generally used at present for obtaining PVC-L, is very high, the apparent specific gravity being about less than 0.2 gr./cm.$^3$. However, in order that a stable swollen slurry can be obtained upon mixing with a solvent, it became apparent that the apparent specific gravity of the polymer must be adjusted so that it is 0.3–0.6 gr./cm.$^3$. In raising the apparent specific gravity of those polymers with apparent specific gravities less than 0.2 gr./cm.$^3$, it is preferable to use, for example, singly or in combination one or two or more of the methods given below. By the use of these methods the specific apparent gravity can be raised to maximum 0.7 gr./cm.$^3$. While the following three methods have been given, they are merely intended in an illustrative sense, and the invention should not be limited thereby.

(a) The method of heating the PVC-L at a temperature in a range that is above the temperature at which the thermal motion of the molecule becomes active whereby stabilization of the fine structure occurs, but below the point at which discoloration occurs, thermal decomposition, etc. can be avoided.

(b) The method of first adding a mixture of a good solvent and a non-solvent to the PVC-L and allowing a small quantity of the solvent to be absorbed therein, and thereafter heat treating this to a temperature within the range as mentioned in subparagraph (a), above.

(c) The method of adding a small quantity of solvent to the polymerization system during the polymerization reaction for obtaining PVC-L, and after separating the polymers from the polymerization system, heat treating the same within the temperature range as mentioned in subparagraph (a), above.

Now, if the method of adjusting the apparent specific gravity is described in further detail, it is as follows:

(a) The temperature at which the thermal motion of the molecules becomes active is 70–80° C., which temperature is generally referred to as the softening point. At a temperature higher than this, on account of the softening of the polymer, stabilization of the structure occurs. On the other hand, while the temperature at which discoloration and thermal decomposition can be avoided is in case of polyvinyl chloride generally at below 150° C., by adding a stabilizer as shown in subparagraphs (b) and (c), below, it is also possible to raise this temperature greatly. Since these temperatures at which the motion of the molecules becomes active and at which decomposition and discoloration occur are inherent in the separate polymers, these details may be determined by experiment for the polymers that are to be used. As to the length of time that this heat treatment should be given, the higher the temperature, the shorter the time may be. However, it is desired that the treatment be given uniformly.

While the heating medium may be any means that can give a uniform heat treatment to the polymers, from a practical standpoint, steam, air, etc. are conveniently used.

(b) In this case, as good solvents, there can be cited tetrahydrofuran, cyclohexanone, methyl isobutyl ketone, acetone, dioxane, etc. and as non-solvents, water, methanol, gasoline, etc. In mixing the two, it is necessary to insure that an intersoluble solution is made.

While the minimum solvent concentration will differ depending on the combination of the solvent and non-solvent selected, if the solvent content in the solution is excessively small, the desired effectiveness in treatment cannot be obtained. For instance, in the tetrahydrofuran-water system, tetrahydrofuran must be over 10%. The upper limit of the solvent concentration must be such that the polymer particles are not dissolved. For example, in case of the tetrahydrofuran-water system, the tetrahydrofuran content must be less than 70% by weight. However, when the solvent concentration is as large as this, in case it is heated, the polymer particles tend to become tacky. Therefore, if the tetrahydrofuran-water system is to be used, it is preferable that the tetrahydrofuran concentration be less than 30%. Moreover, in case the solvent concentration is high, since there is the effectiveness that the removal of the low molecular weight parts of the polymer is effected by means of dissolving, if the ratio of the liquid to the polymers is made more than five times and the polymers are steeped therein for a long period of hours, it is possible to make the polymers into stable polymers that do not contain the low molecular weight parts therein.

On the other hand, if the solvent solution to be added to the PVC-L is to be held to the minimum required amount, generally a liquid to polymer ratio of 0.1–0.4 may be used, and thus the operation is simplified greatly. When performing the aforesaid treatment, if a stabilizer of PVC is mixed in the solvent solution, decomposition can be prevented during the heating that follows this type of solvent treatment. Although the temperature and length of time of this type of solvent treatment has not much effect on the treatment results, in general, it is preferable that it be over 30 minutes at an ordinary temperature.

The heat treatment method as described in subparagraph (a), above, can be used after the solvent treatment, and by this heating the solvent contained in the polymer is driven out.

(c) In a mixed solvent consisting of a solvent and a non-solvent of polyvinyl chloride to which have been added organic peroxides, inorganic peroxides and other radical initiators, vinyl chloride was polymerized in a similar manner as usual at a temperature less than 20° C. with heat, light or other means. That the D/D-value varies in this case depending upon the polymerization temperature used is as described hereinabove. The solvents of the polyvinyl chloride include in this case the generally known tetrahydrofuran, cyclohexanone, nitrobenzene, dioxane, methyl ethyl ketone, etc. and as the non-solvents, water, alcohols, petroleum fractions such as gasoline, aromatic hydrocarbons, etc. Vinyl chloride monomer itself is also included. In combining the solvent and non-solvent, it is preferred that they dissolved each other homogeneously. While the ratio of the mixture will differ with each combination as well as the polymerization conditions such as polymerization temperature, etc., it is preferred that a composition be used in which only the low molecular fraction that is contained in the polymer is dissolved when the polymer and the solvent solution come in contact with each other. For example, in case of the tetrahydrofuran-water system, a 5–50% by weight content of the tetrahydrofuran is desirable—the expected results not being obtainable if less than 5%, while on the other hand, if over 50%, the polymers become tacky and hard of handling.

Next, from the polymerized content thus obtained, the treatment liquid is separated from the polymers by means of filtering, centrifuging, separating, etc., and thereafter given heating and drying treatments at the temperature as set forth in subparagraph (a), above. The heat treatment to be performed in this case may be by air, steam, or other heat media. Although the heat treatment time may be short if the treatment temperature is high, in order to avoid decomposition of the polymer, it is preferable to add in advance a stabilizer of PVC to the polymer.

(d) While the apparent specific gravity of the polymer with an apparent specific gravity of less than 0.2 gr./cm.$^3$ can be raised to a maximum of about 0.7 gr./cm.$^3$ by means of the treatment methods as described in the above subparagraphs (a)–(c), inasmuch as the apparent specific gravity that is finally obtained differs depending upon the individual treatment conditions, by mixing together the individual PVC-L's thus treated or by mixing with others not so treated, it is possible to adjust the apparent specific gravity within the range from 0.3–0.6 gr./cm.$^3$. It is to be understood that this naturally includes also those cases where those polymers of various types, whose apparent specific gravities are less than 0.3 gr./cm.$^3$ on account of non-uniformity of their particle size, are mixed among themselves and the apparent specific gravity is made to be more than 0.3 gr./cm.$^3$.

(e) While in subparagraph (d), above, we have described the instance when the polymer was in all cases PVC-L, this subparagraph concerns the case when in the above subparagraph (d) PVC-L is mixed with a polymer other than PVC-L. The operation in this case is similar to that of subparagraph (d), above.

Although the five methods of raising the specific apparent gravity have been described concretely hereinabove, inasmuch as the essence of the matter lies in adjusting the apparent specific gravity of PVC-L to fall within the range of 0.3–0.6 gr./cm.$^3$, it is also possible to suitably manipulate the polymerization conditions for obtaining the PVC-L in various ways so as to prepare the PVC-L to have an apparent specific gravity of 0.3–0.6 gr./cm.$^3$ from the first, and it is to be understood that this naturally is also included in this invention.

(2) *The method of obtaining a stable swollen slurry*

Before describing in detail this method, an explanation will be given of the condition of the stable swollen slurry that we are seeking for. When a powdery polymer is mixed with the solvent which does not dissolve the polymer perfectly at a certain temperature, the pattern of the changes in viscosity by passage of time exhibited by such a mixture generally follows one of the courses as represented by the three curves of A, B, and C in FIGURE 1.

Curve A is that in which the polymer having absorbed practically all of the solvent, the whole system exhibits a wet sand-like appearance, and thus has lost its fluidity. Curve C is a system in which the solvent is absorbed hardly at all by the polymer, and in which the polymer becomes a precipitate. While curve B is a condition which is intermediate to curves A and C, it is that in which the particles of the polymer are restrictedly swollen by the solvent and while maintaining this swollen state, the viscosity of whole system tends to reach a state of equilibrium without the destruction of the swollen polymer particles and moreover while maintaining a state in which the polymers are not segregated from the solvent. It is that of a slurry which shows a constant fluidity as well as practically no change in its condition with the passage of time. We shall refer to the slurry system, as represented by curve B, whose viscosity reaches an equilibrium value and in which the viscosity shows small change in its condition with the passage of time as "the stable slurry." We found that it was possible with the same weight composition even in case of a concentrated solution system of PVC-L, which is unstable and tends to gelation even when made into a perfect solution, to obtain a slurry state in which the swelling does not continue as shown in curve B of FIGURE 1, and thus possesses stability and fluidity for a comparatively long period of hours. And since if the various operations other than the dissolving required for spinning, such as transportation, deaeration, mixing, etc. could be performed in this state, there was no necessity of handling the solution for long periods of hours in an unstable state. Therefore, we found that it was very advantageous, since the fiber formation by spinning could be performed while the solution was in a perfectly dissolved state.

A few examples of the conditions will be given below in order to show what type of polymers and what type of solvents will be used and in what manner to attain the objective of producing fibers and also in obtaining the slurry whose state is as shown in curve B of FIGURE 1.

(a) That PVC-L with an apparent specific gravity of 0.3–0.6 is used.

(b) That the solvent is a mixed solvent in which at least one of its components is ketone with a carbon atoms number of 3 to 8.

(c) That preferably a solvent whose surface tension is great is used.

Each of the above conditions will be described in detail below.

(d) The apparent specific gravity of PVC-L can be made to be from 0.3–0.6 gr./cm.³ by the several methods as already described above.

(1) It is believed that by a treatment such as this the fine structure of the polymer becomes compact and dense and its porous character is lost, whereby the amount of the solvent that permeates into the polymer particles when the polymer and solvent are blended is restrained. The lesser the extent of the treatment described in subparagraph (1) and the smaller the apparent specific gravity, the state of the slurry proximates that of curve A in FIGURE 1 and the equilibrium state of viscosity becomes high. On the other hand, when the treatment is extensive and the apparent specific gravity becomes more than 0.6, the state of the slurry being similar to that of curve C of FIGURE 1 and not exhibiting a homogeneous slurry-like state, segregation is caused between the polymer and the solvent. However, in the case of those polymers having an apparent specific gravity of more than 0.6 and which do not form stable slurries, it is also necessary to first either mix them with other polymers which have been treated or untreated polymers, whereby their apparent specific gravities are adjusted to 0.30–0.60 gr./cm.³ in order to obtain the swollen equilibrium.

(b) It is first necessary that the solvent, when heated, possesses solvent power capable of forming the perfect solution necessary for attaining the objective of fiber formation. At the same time, it must be such that it will form the stable slurry possessed of fluidity. That is, it must be such that while at comparatively low temperatures it only manifests solvent power to the extent that it causes restrictive swelling of the polymer particles. At high temperatures it must possess sufficient solvent power as will completely dissolve the polymer. Although the solvent that satisfies this condition may be a single one, we were able to find many that satisfy the above condition from among the mixed solvents of two components that are obtainable commercially with relative ease.

As suitable solvents that can achieve this objective, there can be given a single or a mixed solvent which contains at least as one of its components aliphatic ketones having 3 to 8 carbon atoms. Of these, in most instances the mixed solvents are particularly suitable for achieving the objective. As these ketones, there can be illustrated acetone, methyl ethyl ketone, iso-propyl ketone, methyl iso-amyl ketone, ethyl iso-propyl ketone, di-iso-propyl ketone, diacetone alcohol, mesityl oxide, phorone, iso-phorone, etc.

While any optional two of the foregoing may be mixed, in case another component is to be mixed, as examples of such other components there can be cited aromatic hydrocarbons, chlorinated hydrocarbons, ether derivatives of ethylene glycol, and esters derived from aliphatic alcohols. And, as aromatic hydrocarbons, there can be named benzene, toluene, ethyl benzene, and xylene, as chlorinated hydrocarbons, dichloroethane, tetrachloroethane, and chlorobenzene, as ethers from ethylene glycol, dioxane, and as esters from aliphatic alcohols, ethyl acetate and amyl acetate. From the standpoint of solvent power, the ratio by weight of the composition of the mixed solvent is suitable if one of the components is made to be 95–20% of the ketone having 3 to 8 carbon atoms and the other component is made to be 5–80%. Also since those having a high boiling point is at a disadvantage in the removal of the solvent after fiber formation, it is preferred that the selection be made so that the boiling point of the mixture becomes less than 170° C. Furthermore, in consideration of the time when the slurry is heated and dissolved, in case the temperature necessary for dissolving the polymer at the desired concentration is far higher than the boiling point of the mixed solvent, by the following two methods it is possible to easily avoid the boiling of the solvent at the time of dissolving; namely, either by suitable selection of the component other than the ketones, whereby the boiling point is raised without change in solvent power or by selection as ketone component that whose molecular weight is larger, whereby the solvent power is increased.

(c) While we have stipulated in the above subparagraph (b) that the solvent for obtaining the stable slurry must in the first place possess sufficient solvent power, another important thing with regard to the solvent is its surface tension. In subparagraph (b), as solvents the cyclic ethers such as trimethylene oxide, tetrahydrofuran, etc. were omitted. This was because these are good solvents with low viscosity and moreover whose interfacial tension with PVC-L is small, which even when making contact with the polymers when cold, by their sudden permeation into the polymer particles causes them to swell excessively and thus cannot form a stable slurry.

If mention is to be made of the relationship between the surface tension of the solvent and the type of polymer with which it is to be mixed, it is that, generally speaking, in case of a solvent with low surface tension, it is suitable to use a polymer, having a high apparent specific gravity in combination therewith. The reason for this is because with this type of polymer, on account of the fine structure being compact and dense, even though the surface tension of the solvent is small, the permeation of the solvent can be restrained remarkably well, and it is possible to avoid the sudden and excessive swelling of the particles. However, if the treatment of the polymer has been overdone and the apparent specific gravity of the polymer is more than 0.6, the fine structure of the particle becomes too hard, and since it will no longer permit the penetration of the solvent at room temperature, it is not possible to prepare a stable slurry by itself alone. Moreover, even though a stable slurry has been formed by mixing the polymer with a solvent having a high surface tension, and an equilibrium state of viscosity has been obtained, in case this polymer is combined with a solvent having low surface tension, it does not necessarily follow that an equilibrium state of viscosity will be obtained. Even if equilibrium is obtained, it is usual that its equilibrium viscosity is high.

By reference to the various methods, as hereinabove described, it is possible to obtain a stable slurry with small change in its viscosity. However, a slurry that is convenient for spinning is that which shows a viscosity of 5-200 stokes. This is because if it is less than 5 stokes, there is the possibility that the polymer and solvent which has already been mixed will segregate. On the other hand, if the viscosity is more than 200 stokes, because of its excessive viscosity, the handling of the slurry becomes difficult with such possibilities of the progressive viscosity increase during its storage and periods of stagnancy as well as difficulties of transportation.

Even after the various values with respect to the polymer and the solvent have been decided as above, the equilibrium viscosity that is exhibited by the slurry obtained by mixing the above may be adjusted by changing its thermal career in mixing. Therefore, by merely adjusting the temperature, it is possible to adjust the viscosity of the slurry to 20-80 stokes which is the most convenient for its handling. Since the rise in temperature in this case brings about an irreversible increase in viscosity, while it is possible to raise the temperature of the slurry for the purpose of raising its viscosity, once the temperature has been raised, the lowering of the viscosity of the slurry is not possible by a later lowering of the temperature. Needless to say, while the viscosity of the slurry varies with the mixing ratio of the polymer and the solvent, i.e. the concentration, it is limited by the fact that it must be within the range wherein it will permit ease of operations such as transportation in the slurry state, and moreover can be spun when heated and dissolved. The suitable concentration is 20-40%. The slurry which has been obtained in this manner is stable, and so long as it is kept at room temperature the swelling does not progress nor is there a change in its viscosity. Thus, it is readily possible to remove the bubbles that have become mixed in during the preparation of the slurry either by leaving it standing or by performing slow or mild mixing, and moreover its stability can be maintained during the time require for carrying out the various operations such as transportation, filtering, etc.

Furthermore, by adding during the preparation of the slurry other polymers that are directly soluble in the solvent in an amount less than 10% by weight with respect to the PVC-L, it is possible not only to prevent a sudden change in the viscosity of the slurry but also by the spinning of blended polymers to impart to fibers properties not possessed by PVC-L.

(3) *The method of dissolving the slurry.*

The production on an industrial scale in a most effective manner of the polyvinyl chloride fibers improved in their thermal properties is achieved by carrying out the following operations with respect to the stable slurry whose viscosity change is small, this slurry having been obtained, as hereinabove described, by increasing the apparent specific viscosity of the PVC-L polymer and then combining the polymer with the solvent. Namely, we found the method of spinning wherein this type of slurry, immediately prior to the spinning, having been heated and dissolved at a temperature of 100-200° C., was made into a viscous transparent dope, and then, if required, filtered, and immediately spun from a spinneret. The viscous transparent dope, as used in this invention, which has been obtained by heating and dissolving the aforementioned PVC-L, differs completely from the ordinary entirely dissolved solution of polymer in the fact that it tends to cause phenomena such as decomposition, discoloration, etc. as a result of the rise of its viscosity with the passage of time, and if the temperature falls, with a sudden rise in viscosity, it becomes difficult to perform the various time-consuming operations as have been heretofore practiced such as storage, transportation, etc. Hence, the necessity arises in these instances of reducing to the minimum the time required for the heating and dissolving operation as well as the time that elapses between the heating and dissolving operation and the spinning operation. The temperatures at which the heating is to be performed during the heating and dissolving of polymer is determined by such as the solvent power of the solvent, the concentration of the slurry, the average degree of polymerization of the polymer, its $D/D$-value, etc. While it suffices with a comparatively low temperature when a polymer of a low degree of polymerization and having a small $D/D$—value is dissolved to a low concentration using a solvent having a high solvent power, in producing economically the fibers improved in their thermal properties, heating at about 100-200° C. is required. A temperature of over 200° C. not only tends to cause thermal decomposition but also makes operations difficult of performing even if a stabilizer is added.

When filtration is required, while it is preferable to perform the filtration subsequent to the heating and dissolving operations if consideration is given to the points of pressure required for filtration and the filtration effectiveness, it is also possible to perform the filtration while being transported in the slurry state or the two operations may be combined.

To prevent the solvent from boiling when it is being extruded from the spinneret, the temperature of either the dope prior to its being spun or that of the spinneret may be lowered. Furthermore, while it is permissible to add a small amount of plasticizer to improve the fluidity of the solution, or a stabilizer to prevent thermal decomposition, for maintaining the quality of the product, it is best to hold this to as small an amount as possible.

The polyvinyl chloride fibers can be obtained by spinning the thus obtained polymer solution through a spinneret using either the dry spinning or the wet spinning process. However, in this invention, the dry spinning process is the more efficacious.

By imposing the conventional drawing operation of drawing to 2-10 times at a temperture of 95-115° C. and giving a heat treatment at 70-130° C. to the polyvinyl chloride fibers produced by using the highly crystalline vinyl chloride polymers obtained as described hereinabove, it is possible to obtain fibers excelling in dimensional stability the fibers that are obtained from polymers by the high temperature polymerization method.

However, it has been found that polyvinyl chloride fibers with further improvements in their dimensional stability could be obtained by performing the drawing method and heat treatment method as described below.

While polyvinyl chloride fibers are imparted great tenacity with respect to stretching by being imposed the conventional hot drawing of 2-10 times at a temperature of 95-115° C., in accordance with our studies, we found that it was possible to obtain polyvinyl chloride fibers excelling in thermal as well as mechanical properties even though the drawing ratio during hot drawing was less than 2 times. What we found was that it was sufficient if the product of the drafting ratio at spinning and the drawing ratio at hot drawing became more than 2.0. This means that it is possible to obtain serviceable fibers even if drafting at spinning is only imposed and hot drawing is not performed. However, from the standpoint of spinning technique, there is a limit to the increase possible in this drafting ratio at spinning, it being difficult to increase this ratio too much. By giving heat treatment after drawing at a temperature of 70–170° C. to the fibers obtained from PVC-L, fibers with still greater improvements in their dimensional stability can be obtained.

In the conventional polyvinyl chloride fibers, due to the fact that the softening temperature exhibited by the polymer was low and the tenacity at high temperature of the fibers was exceedingly small, it was not possible after hot drawing to heat treat at constant length the fibers at a temperature above 130° C. since breaks in the fibers would occur on account of thermal stress. However, in accordance with the fibers of this invention, it has become possible to perform the heat treatment at above 130° C. since, as has already been described hereinabove, the polymer itself is highly crystalline and has a small thermal stress, and the tenacity at high temperature of the fibers is great. When the heat treatment is carried out at such a high temperature as this not only is it possible to obtain the desired results in a short time, but also the results obtained are great. While the time required for heat treatment will vary depending on the treatment effects that one expects normally, the time required will be that time which will make possible the reduction of the residual solvent of the fiber formed to an amount less than 0.5%.

During the heat treatment, other heretofore known ones such as heat treatment with restricted shrinking, heat treatment with free shrinking, and heat treatment with stretching may also be performed besides the heat treatment at constant length. In general, the combination of heat treatment at constant length and heat treament with shrinking not only makes possible the further raising of the heat treatment temperature but also is useful in the improvement of the properties of the fiber. Inasmuch as thermal decomposition cannot be avoided when heat treatment is performed for more than 10 minutes at a temperature of more than 170° C., it is not suitable for the production of fibers. By reference to Table IV, it can be seen more clearly how great an improvement may be obtained in the thermal and mechanical properties by these conditions.

ples 1% was obtained. This was then made the stiffness, which was used as the criterion for indicating the state of softening. If the ratio of the stiffness of the two samples at 100° C. are sought from FIGURE 2, sample No. 1 is more than 5 times that of sample No. 2. Thus, it has been shown that the hardness of the polyvinyl chloride fiber whose $D/D$-value is 1.192 is indeed more than 5 times that of the conventional polyvinyl chloride fiber.

While hereinabove we have described the instance when pure polyvinyl chloride is used, in this invention, of those vinyl chloride polymers polymerized at a low temperature, those containing as a whole more than 90 mol percent of vinyl chloride units may be used. These types of polymers may be either obtained by copolymerization or polymer blending, or the combination of thereof. As comonomers in the copolymerization, there can be cited the vinyl compounds and the olefins that are capable of being copolymerized with vinyl chloride. And as the polymer that can be used in polymer blending, any polymer capable of being dissolved in the solvent of polyvinyl chloride may be used: for example, there may be cited such as polystyrene, the polyacrylates, the polymethacrylates, polyacrylonitrile, polyvinyl acetate, or the polyvinyl chloride obtained by the high temperature polymerization method.

Thus, in accordance with this invention, it is possible to obtain on an industrial scale fibers using as starting materials highly crystalline vinyl chloride polymers containing more than 90 mol percent of vinyl chloride units and mixed polymers obtained by mixing this type of vinyl chloride polymer with other polymers insuring that the total vinyl chloride units contained in the mixture does not become less than 90 mol percent. The fibers obtained by the method of this invention are superior to the conventional polyvinyl chloride fibers, especially with respect to such properties as dimensional stability as well as tenacity, extensibility, etc. at high temperatures.

In order to more clearly understand the present invention, the following specific examples are given, it being

TABLE IV

| Drawing condition | Heat setting condition | Properties of fibers [a] | | |
|---|---|---|---|---|
| | | $S$ [b] (percent) | Strength (gr./den.) | Extensibility (percent) |
| Draw ratio: 5.5 Temperature: 110° C. Medium: in saturated steam. | None | 34.3 | 2.63 | 19.7 |
| | 115° C.—3 mins. (A) [c] | 12.0 | 2.72 | 21.4 |
| | 130° C.—3 mins. (A) | 7.2 | 2.77 | 22.5 |
| | 145° C.—3 mins. (A) | 6.6 | 2.69 | 23.1 |
| "Not drawn" | None | 11.8 | 0.47 | 57.3 |
| Drafting ratio at spinning: 2.2. | 130° C.—5 mins. (A) | 4.3 | 0.61 | 27.7 |
| Draw ratio: 4.0 Temperature: 115° C. | None | 35.9 | 2.61 | 19.0 |
| Medium: on hot plate | 130° C.—0.5 mins. (A) | 13.8 | 2.77 | 21.4 |
| | 130° C., thereafter (B) [d] 3 | 66.2 | 2.54 | 28.9 |

[a] Test fibers were spun by dry spinning from methyl ethyl ketone and toluene solution containing 28 weight percent of polymer ($D/D=1.188$, $\overline{P}=1190$). The drafting ratio at spinning was 1.2, unless otherwise mentioned.
[b] $S$—Percent shrinkage on immersing the fiber in boiling water for 5 minutes.
[c] (A)—Heat set at constant length.
[d] (B)—Heat set at 130° C. with restrictive shrinking of 10%.

Figure 2:
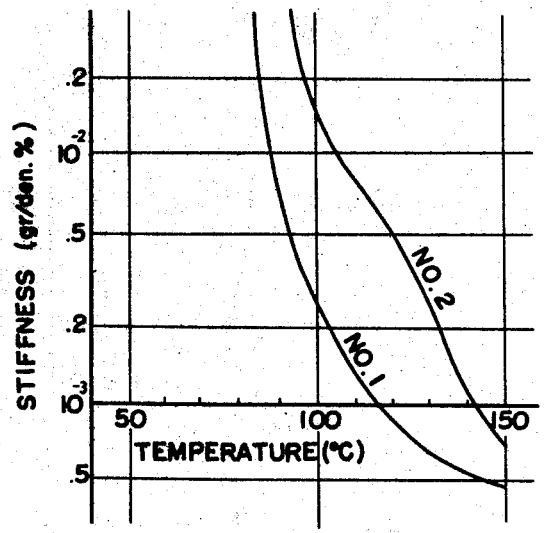

In conclusion, the significant differences between the polyvinyl chloride fibers obtained in accordance with this invention and those obtained by the heretofore known methods will be additionally described by means of FIGURE 2. FIGURE 2 is that which shows the behavior of the thermal softening points of the two types of fibers, which were, except for the difference in the $D/D$-values and $\overline{P}$, obtained under identical production conditions. Precisely, this drawing is that in which the respective samples Nos. 1 and 2 were heated at a constant rate of temperature elevation of 1.0° C./min. under the loads of 0.010 gr./den. and 0.030 gr./den. respectively, and from the respective thermal shrinkage that were manifested thereby, the load required to stretch the fiber samunderstood that the same are merely intended in an illustrative sense, and the invention should not be limited thereby, but only insofar as the same may be limited by the appended claims.

EXAMPLE 1

To vinyl chloride monomer, 1.13 mol percent thereof of tri-n-butyl boron was added, and the mixture was polymerized at −20° C. in nitrogen atmosphere with stirring. After 3 hours the polymerization was terminated by the addition of a mixture of conc. NH$_4$OH aq. and methanol and the resulting polymer was separated and washed with methanol. By air-drying the same at 50° C., a white powdery polymer is obtained at 26.7% yield. This polymer then was dissolved in cyclohexanone at the concentration of 4 g./l., and the solution showed at 30° C. an average degree of polymerization of 1240 when measured by Ostwaldt Viscometer.

The polymer also showed an apparent specific gravity of 0.16, and a D/D of 1.184.

When this polymer was heat treated for 15 minutes in the steam under pressure of 110° C., the apparent specific gravity went up to 0.38.

30 parts of this heat treated polymer were mixed into a mixed solvent consisting of 21 parts of cyclohexanone and 49 parts of benzene at 0° C. When said temperature is maintained with continuous stirring, the mixture reached the equilibrium state of viscosity after 100 minutes, and a stable slurry of uniformly swollen polymer particles having a viscosity of 5 stokes was obtained.

This slurry was dissolved into dope by passing continuously through a heating tube at 145° C., and thereafter the dope having a lowered temperature of 100° C. was spun into a hot air stream of 135° C. through a spinneret, and after the solvent was vaporized therefrom, the resulting filamentary yarn was taken up at a winding speed of 240 m./min.

This filamentary yarn was drawn 6 times its original length in a steam under pressure of 110° C., and then heat treated for 3 minutes, by passing through a glycerine bath maintained at the temperature of 145° C.

The properties of the resulting fiber were as follows:

Tenacity _____g./den__ 3.16
Extensibility _____percent__ 26.8
Density _____g./cm.³__ 1.415
Shrinkage in boiling water _____percent__ 8.4
The temperature at which thermal shrinkage under
  the load of 0.01 g./den. becomes 10% ___° C__ 107

Further the properties of the original filamentary yarn which was obtained by heat-melting and spinning the stable slurry under the same conditions, and winding up the same by the speed of 240 m./min. which is 2.4 times the speed of the dope spun out from the spinneret, and those of the fiber obtained by heat treating the original yarn for 3 minutes in steam under pressure without hot-drawing, are compared as follows:

|  | Tenacity (g./den.) | Extensibility (percent) | Shrinkage in boiling water (percent) |
| --- | --- | --- | --- |
| Original filamentary yarn | 0.96 | 83 | 14.2 |
| Heat-set filamentary yarn | 1.01 | 42 | 3.7 |

EXAMPLE 2

To vinyl chloride monomer, 1 mol percent thereof of triethyl boron was added to polymerize the monomer at —40° C., and after 3 hours the polymerization was terminated by the addition of a mixture of conc. ammoniac liquid and methanol. The resulting polymer was separated, washed with methanol, and air-dried at 50° C. A white powdery polymer having an average degree of polymerization of 910, an apparent specific gravity of 0.14, and D/D of 1.248 was obtained at 15% yield.

To each 1 part of this polymer 0.01 part of a stabilizer and 1 part of an aqueous solution containing 20% by weight of tetrahydrofuran were added and mixed well. After being left for an hour, the mixture was heat treated for 10 minutes in steam under pressure of 130° C. and dried at 45° C. A polymer having an apparent specific gravity of 0.44 was obtained.

On the other hand, when 0.01 part of the stabilizer and 1.5 parts of an aqueous solution containing 25% by weight of tetrahydrofuran were added to each 1 part of the polymer having an apparent specific gravity of 0.14, mixed well, left for 30 minutes, heat treated for 30 minutes in steam of 100° C., and dried at 45° C., a polymer having an apparent specific gravity of 0.32 was obtained.

The thus obtained two kinds of polymer, each having an apparent specific gravity of 0.44 and 0.32, respectively, were mixed together at a ratio of 12:18, respectively, to form a blended polymer having an apparent specific gravity of 0.35. Said polymer was then added to a mixed solvent consisting of 30 parts of acetone and 40 parts of toluene at 0° C. with continuous stirring. When the temperature of 0° C. was maintained under said continuous stirring, an equilibrium state of the viscosity was reached after 45 minutes, and a slurry having a viscosity of 125 stokes was formed.

This slurry was continuously dissolved into dope by passing through a heated tube at 150° C., and when the temperature of the dope was gradually lowered to 75° C. near the end of said tube, the dope was spun into a hot air stream of 130° C. through a spinneret. The resulting filamentary yarn was taken up at a winding speed of 170 m./min.

This filamentary yarn was drawn 8 times its original length in a glycerine bath of 115° C., and further heat set by passing through a glycerine bath of 155° C. for one minute. The properties of thus obtained fiber were as follows:

Tenacity _____g./den__ 2.78
Extensibility _____percent__ 16.4
Density _____$(d_4^{20})$__ 1.421
Shrinkage in boiling water _____percent__ 5.9
The temperature at which thermal shrinkage under
  the load of 0.01 g./den. becomes 10% ___° C__ 134

EXAMPLE 3

The polymer obtained in Example 1, having an apparent specific gravity of 0.16, a degree of polymerization of 1240 and a D/D of 1.184, was steeped for 30 minutes in 10 times by volume of 20% aqueous solution of tetrahydrofuran containing 1% by weight of a stabilizer at a room temperature. Then the polymer was filtered, heat treated for 30 minutes in steam of 100° C., and air-dried at 50° C., resulting in the formation of a polymer having an apparent specific gravity of 0.30.

Also, by similarly steeping the polymer of Example 1, heat treating the same in steam under pressure of 130° C. for 10 minutes followed by air-drying at 80° C. for 2 hours, a polymer of an apparent specific gravity of 0.49 was obtained.

Each 15 parts of the above polymers of apparent specific gravities of 0.30 and 0.49, respectively, were mixed well, and the resulting blended polymer of an apparent specific gravity 0.39 was added to a mixed solvent consisting of 35 parts of methyl ethyl ketone and 35 parts of benzene in a mixing vessel at 0° C. with continuous stirring. When said temperature was maintained under said continuous stirring, a stable slurry of uniformly swollen polymer particles having a viscosity of 52 stokes was obtained.

This slurry was continuously sent into a heated tube at 145° C. by a gear pump, and dissolved therein. When the temperature of the dope was lowered to 100° C., the dope was spun through a spinneret into a spinning cell through which a hot air stream of 135° C. was constantly passing. After the solvent was vaporized, the produced filamentary yarn was taken up at a winding speed of 240 m./min.

This yarn was drawn 6 times its original length in steam under pressure of 110° C., and then heat treated for 3 minutes by passing through a glycerine bath of 145° C.

The properties of the obtained fiber were as follows:

Tenacity _____g./den__ 3.05
Extensibility, percent _____ 17.5
Density _____$(d_4^{20})$ 1.411
Shrinkage in boiling water, percent _____ 8.2
The temperature at which thermal shrinkage under
  the load of 0.01 g./den. becomes 10% ____° C__ 119

EXAMPLE 4

Two hundred parts of vinyl chloride were dissolved into 280 parts of methanol, and polymerized for 18 hours under the irradiation of 300 W. high pressure mercury lamp at −5° C., with the addition of 1 mol percent based on the monomer, of di-tert-butyl peroxide and triethanolamine. The resulting polymer was separated, washed with methanol, and dried at 50° C. A white powdery polymer having an average polymerization degree of 2150, an apparent specific gravity of 0.19 and a $D/D$ of 1.145 was obtained at 34.5% yield.

When this polymer was heat treated for 15 minutes in steam under pressure of 120° C., the product's apparent specific gravity became 0.32, and when heat treated for 15 minutes in steam under pressure of 130 C., the resulting polymer had an apparent specific gravity of 0.43.

By mixing up each 10 parts of these three polymers having each different apparent specific gravity, a blended polymer of apparent specific gravity 0.39 was obtained.

30 parts of this blended polymer were then added to a mixed solvent cooled below 0° C., consisting of 28 parts of cyclohexanone containing 0.3 part of a stabilizer, and 42 parts of benzene with continuous stirring, while maintaining the temperature of the solution at 0° C. After 60 minutes an equilibrium state of the viscosity was reached, and a stable slurry of uniform composition having a viscosity of 6 stokes was obtained.

This slurry was continuously sent into a tube which was heated to 158° C. by a gear pump to be dissolved into dope, and the temperature of said dope was lowered to 110° C. in said tube. Thereafter the dope was spun through a spinneret into a spinning cell through which a hot air stream of 140° C. was constantly passing. The resulting filamentary yarn was taken up at a winding speed of 120 m./min.

This filamentary yarn was drawn 5 times its original length in hot water of 96° C., and then heat treated for 5 minutes by passing through an ethylene glycol bath maintained at 135° C.

The properties of the obtained fibers were as follows:

Tenacity _____ g./den__ 2.38
Extensibility, percent _____ 20.7
Density _____ ($d_4^{20}$)__ 1.399
Shrinkage in boiling water, percent _____ 13.2
The temperature at which thermal shrinkage under the load of 0.01 g./den. becomes 10% ____ °C__ 115

The following Examples 5 to 10 show recipes for the production of stable slurries, by subjecting a polymer to various treatments. The slurries obtained in accordance with these recipes are suitable for wet-spinning as well as dry-spinning, providing fibers of excellent thermal properties.

EXAMPLE 5

By mixing 11.2 parts of the polymer of Example 1 having an apparent specific gravity of 0.16 and 16.8 parts of the polymer of Example 3 having an apparent specific gravity of 0.49, a blended polymer of an apparent specific gravity of 0.34 was obtained.

This polymer was added to a mixed solvent consisting of 36.0 parts of methyl ethyl ketone containing 0.14 parts of a stabilizer and 36.0 parts of toluene at 0° C., which temperature was maintained for 45 minutes till the equilibrium state of the viscosity was reached, and a stable slurry having a viscosity of 51 stokes was obtained.

EXAMPLE 6

By mixing each 13 parts of the polymers of the Example 4 each having an apparent specific gravity of 0.19 and 0.43, a blended polymer of an apparent specific gravity 0.35 was obtained. This polymer was added to a mixed solvent consisting of 37 parts of methyl ethyl ketone containing 0.1 part of a stabilizer and 37 parts of xylene at 0° C., which temperature was maintained for 50 minutes till an equilibrium state of viscosity was reached and a stable slurry having a viscosity of 32 stokes was obtained.

EXAMPLE 7

13.6 parts of a polymer having an apparent specific gravity of 0.35, obtained by heat treating the polymer of Example 1 having an apparent specific gravity of 0.16 for 10 minutes in steam under pressure of 120° C., was mixed with 20.4 parts of the polymer of Example 3 having an apparent specific gravity of 0.49. A blended polymer of an apparent specific gravity 0.42 was obtained.

This polymer was added to a mixed solvent consisting of 30 parts of methyl ethyl ketone containing 0.2 part of a stabilizer and 36 parts of benzene at 0° C. and maintained under the same temperature for 35 minutes, till the equilibrium state of viscosity was reached and a stable slurry having a viscosity of 106 stokes was obtained.

EXAMPLE 8

15 parts of the polymer of Example 2 having an apparent specific gravity of 0.44 and 15 parts of a polymer of an apparent specific gravity 0.30, obtained by heat treating the polymer of Example 2 having an apparent specific gravity of 0.14 for 10 minutes in steam under pressure of 120° C., were mixed together and a blended polymer of an apparent specific gravity 0.36 was obtained. This polymer was added to a mixed solvent consisting of 35 parts of methyl isobutyl ketone containing 0.2 part of a stabilizer and 35 parts of benzene at 0° C. When said temperature was maintained for 50 minutes, the equilibrium state of viscosity was reached and a stable slurry having a viscosity of 72 stokes was obtained.

EXAMPLE 9

30 parts of the polymer obtained in Example 2 having an apparent specific gravity of 0.44 were added to a mixed solvent consisting of 28 parts of methyl isobutyl ketone containing 0.3 part of a stabilizer and 42 parts of toluene at 0° C. Said temperature was maintained for 50 minutes till the equilibrium state of viscosity was reached and a stable slurry having a viscosity of 9 stokes was obtained.

EXAMPLE 10

A polymer having an apparent specific gravity of 0.31 was obtained by heat treating the polymer obtained in Example 4, having an apparent specific gravity of 0.19, for 5 minutes in steam of 110° C. 30 parts of this polymer were added to 70 parts of cyclohexanone containing 0.3 part of a stabilizer at 0° C. Said temperature was maintained for 60 minutes till the equilibrium state of viscosity was reached, and a stable slurry having a viscosity of 11 stokes was obtained.

In the following Examples 11 to 14, recipes for obtaining stable slurries by adding solvents at the time of polymerization are shown. These slurries are suitable for wet-spinning as well as dry-spinning, providing fibers of improved thermal properties.

EXAMPLE 11

250 parts of vinyl chloride monomer were added to 250 parts of methanol containing 20% by weight of tetrahydrofuran at −20° C. in an atmosphere replaced by nitrogen. Then immediately after the addition of 4 parts of triethyl boron thereto with stirring, the polymerizing reaction was initiated. After the reaction was continued for 4 hours, the polymerization was terminated by adding a mixture of ammonia and methanol. The resulted polymer was separated, washed with methanol solution containing 20% by weight tetrahydrofuran, and dried at 80° C. A white powdery polymer having an apparent specific gravity of 0.32, and an average polymerization degree of 1190 was obtained at 28% yield.

This polymer was again thoroughly washed with methanol and measured with an infrared absorption spectrum, the value of its $D/D$ being 1.173.

By mixing this polymer with a mixed solvent in accordance with the following recipe, a stable slurry was obtained.

| | | |
|---|---|---|
| Polymer | Parts | 26 |
| Methyl isobutyl ketone | do | 33 |
| Benzene | do | 41 |
| Stabilizer | do | 0.3 |
| Time required before equilibrium of viscosity was reached | min | 40 |
| Viscosity at the time of equilibrium | stokes | 60 |
| Temperature | °C | 0 |

EXAMPLE 12

An autoclave provided with a stirrer was charged with 400 parts of 20% tetrahydrofuran aqueous solution, 20 parts of 10% sodium laurylsulfate aqueous solution, and 4.0 parts of tri-n-butyl boron, which were mixed together. 120 parts of vinyl chloride were added thereto under pressure, and reacted therewith at 5° C. for 8 hours with stirring. The resulted polymer was separated, washed with 20% tetrahydrofuran aqueous solution, and dried at 95° C. The thus obtained polymer had an apparent specific gravity of 0.38, an average polymerization degree of 1320, and a $D/D$ of 1.108, with 48% yield.

0.14 part of this polymer was mixed with 0.14 part of a polymer having an apparent specific gravity of 0.57, obtained by heat treating the first polymer for 20 minutes in steam under pressure of 110° C., and a blended polymer of an apparent specific gravity 0.47 was obtained.

This polymer formed a stable slurry by the following recipe:

| | | |
|---|---|---|
| Methyl ketone | parts | 36 |
| Toluene | do | 36 |
| Time required before the equilibrium state was reached | min | 35 |
| Viscosity at the time of equilibrium | stokes | 51 |
| Temperature | °C | 0 |

EXAMPLE 13

To the mixture of 100 parts of vinyl chloride and 10 parts of cyclohexanone, 0.3 part of tri-n-butyl boron was added in nitrogen current at −30° C., and the resulting polymerization was continued for 5 hours under stirring. The thus obtained polymer was divided into two parts and each part was heated to 80° C. and 100° C., respectively, both parts yielding slightly yellowish polymers of an average polymerization degree 1650. The apparent specific gravity of the former was 0.49, and that of the latter with higher heating temperature, 0.56.

A stable slurry was obtained from these polymers by the following recipe:

| | | |
|---|---|---|
| Polymer of an apparent specific 0.49 | parts | 16 |
| Polymer of an apparent specific gravity 0.56 | do | 16 |
| (Their blended polymer having an apparent specific gravity of 0.52.) | | |
| Cyclohexanone | do | 34 |
| Toluene | do | 34 |
| Stabilizer | do | 0.35 |
| Time required before the equilibrium of viscosity was reached | min | 50 |
| Viscosity at the time of equilibrium | stokes | 9 |
| Temperature | °C | 0 |

EXAMPLE 14

To the mixture of 150 parts of vinyl chloride and 5 parts of tetrahydrofuran, 1.2 parts of triethyl boron was added in nitrogen atmosphere at −20° C., and reacted therewith with continuous stirring for 6 hours. After the polymerizing reaction was terminated by the addition of a mixed solution consisting of 5 parts of tetrahydrofuran and 2.5 parts of conc. ammonia, the vaporized monomer was recovered. The polymer in the polymerization vessel was then dried while said vessel was heated to 85° C. and dried air was passed through the same. A polymer having a $D/D$ of 1.187, an apparent specific gravity of 0.47 and an average polymerization degree of 1050 was obtained at 24% yield.

A stable slurry was formed from this polymer by the following recipe:

| | | |
|---|---|---|
| The polymer having an apparent specific gravity of 0.47 | parts | 15 |
| A polymer having an apparent specific gravity of 0.32 | do | 15 |
| (Their blended polymer having an apparent specific gravity of 0.39.) | | |
| Acetone | do | 31.5 |
| Toluene | do | 38.5 |
| Stabilizer | do | 0.3 |
| The time required before the equilibrium state of viscosity was reached | min | 40 |
| Viscosity at the time or equilibrium | stokes | 115 |
| Temperature | °C | +5 |

EXAMPLE 15

18 parts of the polymer of Example 14 having an apparent specific gravity of 0.47 were mixed with 12 parts of the polymer of Example 3 having an apparent specific gravity of 0.30, and a blended polymer of an apparent specific gracity 0.38 was obtained. This polymer is mixed into a solvent mixture consisting of 28 parts of methyl ethyl ketone containing 0.3 part of a stabilizer and 42 parts of ethyl acetate at 0° C. When this temperature was maintained for 30 minutes, the equilibrium state of viscosity was reached and a stable slurry having a viscosity of 40 stokes was obtained.

EXAMPLE 16

9 parts of the polymer of Example 11 having an apparent specific gravity of 0.32 were mixed with 18 parts of the polymer of Example 3 having an apparent specific gravity of 0.49. A polymer having an apparent specific gravity 0.42 was obtained.

This polymer was mixed into a mixed solvent consisting of 33 parts of acetone containing 0.15 part of a stabilizer and 40 parts of benzene at 0 ° C. This temperature was maintained for 55 minutes till the equilibrium state of viscosity was reached and a stable slurry having a viscosity of 55 stokes was obtained.

EXAMPLE 17

One part of vinyl chloride monomer and 0.05 part of acrylamide monomer were dissolved in 3 parts of methanol at 0° C. After 0.02 part of benzoyl peroxide was added thereto, the solution was polymerized under the irradiation of ultraviolet light by a high pressure mercury lamp for 16 hours. A polymer having an average polymerization degree of 1500, an apparent specific gravity of 0.15, and a D/D of 1.114 was obtained at 28% yield.

To each 1 part of this polymer, 0.01 part of a stabilizer and 0.5 part of 20% by weight tetrahydrofuran aqueous solution were added, mixed well, left for 30 minutes, heat treated for 20 minutes in steam of 110° C., and thereafter dried at 50° C. A polymer having an apparent specific gravity of 0.48 was obtained.

A stable slurry was formed from this polymer by the following recipe:

| | | |
|---|---|---|
| Polymer of apparent specific gravity 0.15 | parts | 11.2 |
| Polymer of apparent specific gravity 0.48 | do | 16.8 |
| (Their blended polymer having an apparent specific gravity of 0.34.) | | |
| Methyl ethyl ketone | do | 36 |
| Ethylene chloride | do | 36 |
| Stabilizer | do | 0.2 |
| The time required before the equilibrium state of viscosity was reached | min | 35 |
| Viscosity at the time of equilibrium | stokes | 57 |
| Temperature | °C | 2 |

The thus obtained slurry was spun in a similar manner as in Example 3, and the resulting filamentary yarn was drawn 4 times its length on a hot plate, thereafter heat set in a hot air of 140° C. for 2 minutes with 5% thermal shrinkage. The properties of thus treated fiber were as follows:

| | | |
|---|---|---|
| Tenacity | g./den | 2.62 |
| Extensibility | percent | 21.6 |
| Density ($d_4^{20}$) | g./cm.$^3$ | 1.401 |
| Shrinkage in boiling water | percent | 8.3 |
| The temperature at which thermal shrinkage under the load of 0.01 g./d. becomes 10% | °C | 118 |

EXAMPLE 18

An example of obtaining a stable slurry by mixing polymer other than polyvinyl chloride is given hereinbelow.

A stable slurry was obtained according to the following recipe:

| | | |
|---|---|---|
| The polymer obtained in Example 3, having an apparent specific gravity of 0.30 | parts | 15 |
| The polymer obtained in the same example, having apparent specific gravity of 0.49 | parts | 15 |
| Polymethyl acrylate (P=5000) | do | 3 |
| Stabilizer | do | 0.2 |
| Acetone | do | 31.5 |
| Toluene | do | 38.5 |
| Time required before the equilibrium state of viscosity was reached | min | 45 |
| Viscosity at the time of equilibrium | stokes | 133 |
| Temperature | °C | +8 |

The thus obtained slurry was spun in accordance with the method of Example 3, and the resulting filamentary yarn was drawn 6 times its original length in boiling water, and thereafter heat treated in steam under pressure of 130° C. for 6 minutes.

The properties of this fiber were as follows:

| | | |
|---|---|---|
| Tenacity | g./den | 2.96 |
| Extensibility | percent | 21.5 |
| Density | g./cm.$^3$ | 1.408 |
| Shrinkage in boiling water | percent | 9.3 |
| The temperature at which thermal shrinkage under the load of 0.01 g./den. becomes 10% | °C | 116 |

Since it is apparent that many changes and modifications can be made in the above-described details without departing from the nature and spirit of the invention, it is to be understood that the invention is not to be limited thereto except as set forth in the appended claims.

What is claimed is:

1. A method of producing polyvinyl chloride fibers, wherein there is employed as a starting material a polyvinyl chloride polymer containing at least 90 mol percent of vinyl chloride, said polyvinyl chloride polymer having a $D1426/D1434$ value of infrared absorption, as defined, of 1.08 to 1.27, a polymerization degree of between 500 and 2500, and an apparent specific gravity of less than 0.2 g./cm.$^3$, said polyvinyl chloride being obtained by polymerizing vinyl chloride at a low temperature ranging from 20° C. to −50° C., which method comprises heating said polyvinyl chloride at a temperature above the softening temperature at which the thermal motion of the molecules become active whereby stabilization of the fine structure occurs, but below the decomposition temperature of said polymer, thereby increasing the apparent specific gravity of the polyvinyl chloride to 0.3 g./cm.$^3$ to 0.6 g./cm.$^3$, mixing particles of said heat-treated polyvinyl chloride polymer with a solvent therefor, thereby swelling the particles and forming a fluid, stable, swollen mixture with small change in the viscosity thereof, heating the swollen mixture thereby providing a uniform solution of said swollen mixture, and finally extruding the solution.

2. A method of producing polyvinyl chloride fibers, wherein there is employed as a starting material a polyvinyl chloride polymer containing at least 90 mol percent of vinyl chloride, said polyvinyl chloride polymer having a $D1426/D1434$ value of infrared absorption, as defined, of 1.08 to 1.27, a polymerization degree of between 500 and 2500, and an apparent specific gravity of less than 0.2 g./cm.$^3$, said polyvinyl chloride being obtained by polymerizing vinyl chloride at a low temperature ranging from 20° C. to −50° C., which method comprises treating said polyvinyl chloride in a mixture of a good solvent therefor and a non-solvent therefor over a period of time sufficient to absorb a small quantity of said solvent mixture, and thereafter heating said polyvinyl chloride at a temperature above the softening temperature at which the thermal motion of the molecules become active whereby stabilization of the fine structure occurs, but below the decomposition temperature of said polymer, thereby increasing the apparent specific gravity of the polyvinyl chloride to 0.3 g./cm.$^3$ to 0.6 g./cm.$^3$, mixing particles of said heat-treated polyvinyl chloride polymer with a solvent therefor, thereby swelling the particles and forming a fluid, stable, swollen mixture with small change in the viscosity thereof, heating the swollen mixture thereby providing a uniform solution of said swollen mixture, and finally extruding the solution.

3. A method according to claim 1 wherein in the preparation of said polyvinyl chloride a small quantity of solvent is added to the polymerization system in advance, thereby causing the polyvinyl chloride produced to absorb the small quantity of the solvent prior to the separation of the polyvinyl chloride.

4. A method in accordance with claim 2 wherein a ketone having 3 to 8 carbon atoms is used as the solvent.

5. A method in accordance with claim 2 wherein a mixed solution obtained by mixing 95 to 20% by weight of a ketone having 3 to 8 carbon atoms and 5 to 80% by weight of a compound selected from the group consisting of aromatic hydrocarbons, chlorinated hydrocarbons, ether derivatives of ethylene glycol, and esters derived from aliphatic alcohols is used as the solvent.

6. A method in accordance with claim 1 wherein the polymer is mixed with the solvent at a ratio as will give the resulting solution a concentration of 20 percent by weight to 40 percent by weight of the polymer, so that the particles of the polymer are swollen to form a stable swollen mixture having a viscosity ranging from 50 to 200 stokes, more preferably from 20 to 80 stokes with small change in its viscosity in the passage of time.

7. A method in accordance with claim 2, wherein the polymer is mixed with the solvent at a ratio as will give the resulting solution a concentration of 20 percent by weight to 40 percent by weight of the polymer, so that the particles of the polymer are swollen to form a stable swollen mixture having a viscosity ranging from 50 to 200 stokes, more preferably from 20 to 80 stokes with small change in its viscosity in the passage of time.

8. A method in accordance with claim 1 wherein a ketone having 3 to 8 carbon atoms is used as the solvent.

9. A method in accordance with claim 1 wherein a mixed solution obtained by mixing 95 to 20% by weight of a ketone having 3 to 8 carbon atoms and 5 to 80% by weight of a compound selected from the group consisting of aromatic hydrocarbons, chlorinated hydrocarbons, ether derivatives of ethylene glycol, and esters derived from aliphatic alcohols is used as the solvent.

References Cited by the Examiner

UNITED STATES PATENTS

| | | | |
|---|---|---|---|
| 2,481,294 | 9/49 | Corbiere et al. | 260—32.8 |
| 2,517,356 | 8/50 | Sale | 260—32.8 |
| 2,712,490 | 7/55 | Stuchlik | 18—54 |

FOREIGN PATENTS 569,632 6/59 Belgium.

MORRIS LIEBMAN, *Primary Examiner.*

MICHAEL V. BRINDISI, WILLIAM J. STEPHENSON, LEON J. BERCOVITZ, *Examiners.*

UNITED STATES PATENT OFFICE
CERTIFICATE OF CORRECTION

Patent No. 3,183,201                          May 11, 1965

Jiro Shimeha et al.

It is hereby certified that error appears in the above numbered patent requiring correction and that the said Letters Patent should read as corrected below.

Column 22, lines 43 and 50, for "50 to 200", each occurrence, read -- 5 to 200 --.

Signed and sealed this 21st day of December 1965.

(SEAL)
Attest:

ERNEST W. SWIDER
Attesting Officer

EDWARD J. BRENNER
Commissioner of Patents